United States Patent [19]

Hurst

[11] Patent Number: 5,028,077

[45] Date of Patent: Jul. 2, 1991

[54] ADAPTOR FOR CONNECTING A HOSE TO A FAUCET

[76] Inventor: Hollis D. Hurst, 7871 Alabama Ave. #2, Canoga Park, Calif. 91304

[21] Appl. No.: 440,352

[22] Filed: Nov. 22, 1989

[51] Int. Cl.⁵ .............................................. F16L 33/02
[52] U.S. Cl. ...................................... 285/8; 285/252; 285/259
[58] Field of Search ............... 285/5, 8, 252, 253, 285/259, 174

[56] References Cited

U.S. PATENT DOCUMENTS

| 1,117,840 | 11/1914 | Hamilton | 5/8 |
|---|---|---|---|
| 1,543,558 | 6/1925 | Donald | 285/252 |
| 1,971,438 | 8/1934 | Yoder | 285/252 |
| 1,984,347 | 12/1934 | Sutton et al. | 285/8 |
| 1,985,502 | 12/1934 | Isenberg | 285/8 |
| 2,165,926 | 1/1930 | Greene | 285/8 |
| 2,179,654 | 11/1939 | Weiss | 285/8 |
| 2,584,044 | 1/1952 | Osrow et al. | 285/252 |
| 2,688,499 | 9/1954 | Hanson | 285/8 |
| 2,699,357 | 1/1955 | Roth | 285/8 |
| 2,711,331 | 6/1955 | Temple | 285/8 |
| 3,408,091 | 10/1968 | Zylstra | 285/8 |

FOREIGN PATENT DOCUMENTS

| 151146 | 7/1952 | Australia | 285/8 |
|---|---|---|---|
| 782570 | 9/1957 | United Kingdom | 285/8 |
| 876030 | 8/1961 | United Kingdom | 285/8 |
| 2175637 | 12/1986 | United Kingdom | 285/253 |

*Primary Examiner*—Eric K. Nicholson
*Attorney, Agent, or Firm*—James Bartholomew

[57] ABSTRACT

An adaptor is provided with a threaded end for union with a garden hose, or the like, and a conically enlarged opposite end configured to fit about a wide variety of spigots and pipe ends. A worm gear clamp tightened about the adaptor squeezes annular ribs on the interior of the conical end into sealed engagement around a faucet spout or pipe. The conical end of the adaptor includes exterior annular ridges which position and retain an adjustable band of the clamp in alignment with an interior annular rib so that the action of the clamp is focused thereupon for an improved seal. The adaptor includes an internal reinforcement web or mesh to prevent water pressure-induced swelling of the adaptor.

16 Claims, 2 Drawing Sheets

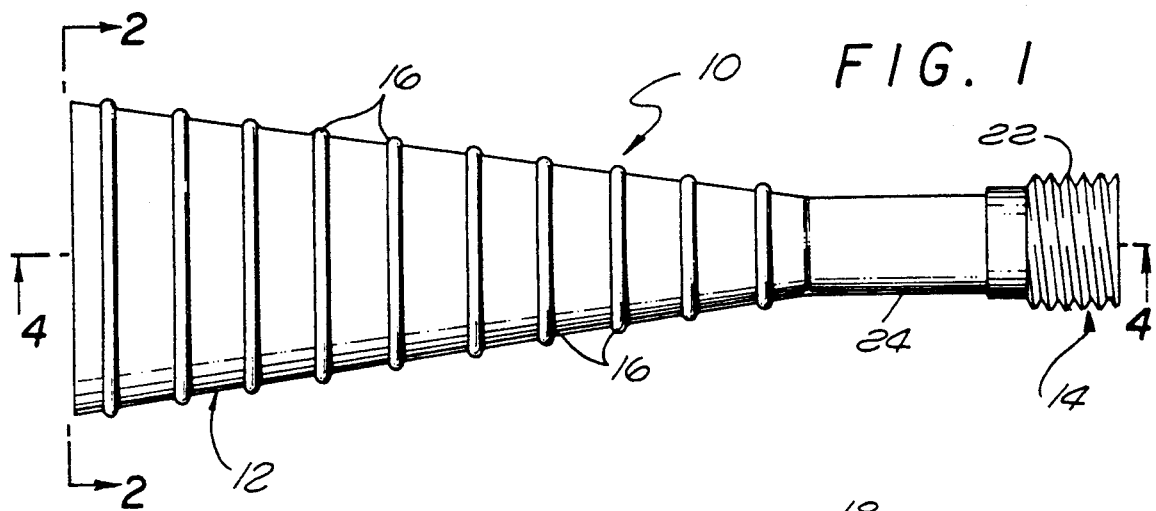
FIG. 1
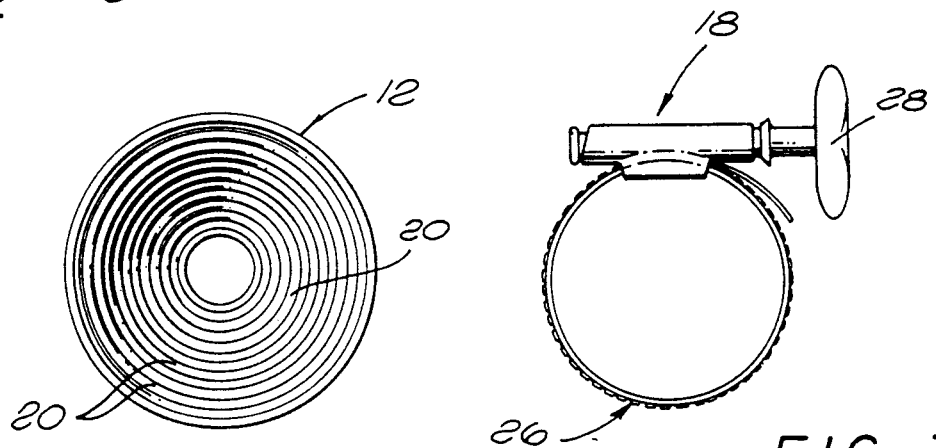
FIG. 2
FIG. 3
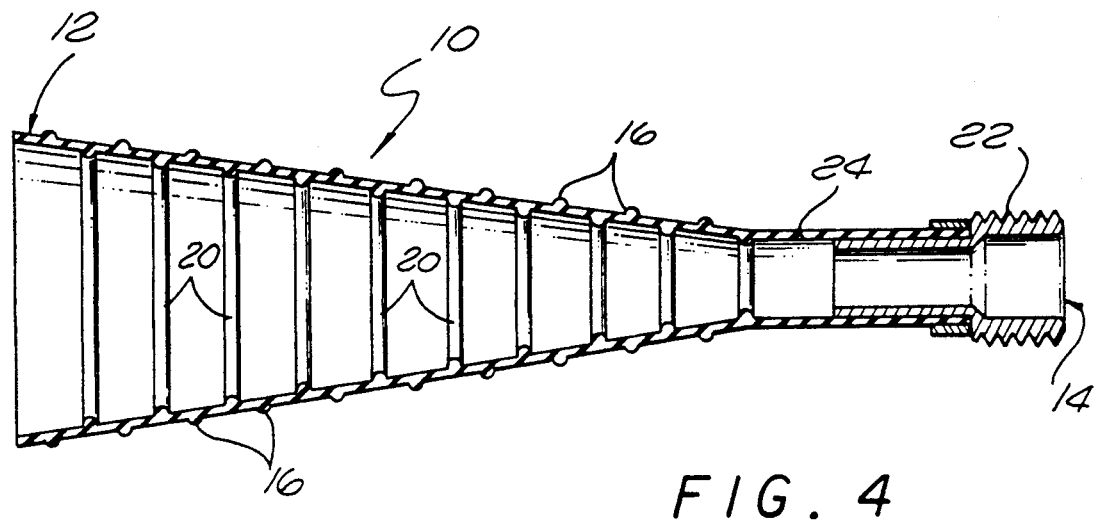
FIG. 4

ADAPTOR FOR CONNECTING A HOSE TO A FAUCET

BACKGROUND OF THE INVENTION

This invention relates generally to an adaptor for connecting a conventional outdoor hose with practically any indoor or outdoor faucet or similar water outlet. More particularly, this invention relates to an adaptor having a reinforced body that includes annular interior ribs for gripping a faucet spout, or the like, and annular exterior ridges which position a clamp in alignment with an appropriate interior rib. Thus, when the clamp is tightened about the adaptor body during use, an improved watertight seal is effected because the exterior ridges ensure that the clamp is correctly located for tightly squeezing the appropriate interior rib about a faucet spout.

Generally, difficulties are encountered when one wishes to utilize a garden hose, or the like, indoors, for example, during filling of a waterbed. At the heart of the problem is the fact that the majority of indoor faucets are not provided with a threaded spout suitable for attachment with a threaded hose. This also presents an obstacle when one needs to employ an indoor faucet as a source of warm water outdoors, for example, when washing a pet or auto. Often, an indoor faucet is the only potential warm water source available because outdoor spigots, if available at all, generally supply only cold water. In such cases, it would be beneficial if one could easily adapt a conventional garden hose for engagement with any faucet spout. Such a practice is also desirable so that outdoor spigots having stripped threads can again be effectively connected with a hose.

A hose having provisions for engaging with an unthreaded spout was previously presented in U.S. Pat. No. 1,117,840. Generally, such prior adaptors are less than ideal. One drawback found in the prior art is a tendency for a faucet-engaging adaptor to swell when water pressure builds up. This ultimately leads to leaks and/or damage to the adaptor. Moreover, prior adaptors for engaging an unthreaded faucet spout generally lack means for effecting an optimum seal about the spout. Another prior limitation is manifest in a previous design wherein a faucet-engaging adaptor is integrally formed with a hose. This precludes such an adaptor's use with another hose of a longer, more desirable length.

There exists, therefore, a need for an improved adaptor which enables a hose to be releasibly engaged with practically any unthreaded faucet spout, particularly indoor faucets, in a manner wherein said adaptor effects an optimum liquid-tight seal about the spout. Such an adaptor should include internal reinforcing to prevent water pressure-induced swelling and should have a threaded free end suitable for connection with any conventional hose of a desired length. Moreover, an improved adaptor is needed which utilizes a clamping arrangement suitable for engaging a pipe outlet as well as most spigots. The present invention fulfills these needs.

SUMMARY OF THE INVENTION

The present invention resides in an improved adaptor for quickly and easily connecting a garden hose, or the like, to practically any faucet spout or pipe end. The adaptor features means for positioning and retaining a clamp at locations whereat clamping action will effect a more positive liquid-tight seal of the adaptor about a water outlet. The improved adaptor generally comprises a flexible body having a conically enlarged first end configured to fit snugly over most spigots and pipes, an adjustable clamp for closing the first end about a spigot, and a threaded second end suitable for connection with most conventional outdoor hoses.

The improved adaptor of the present invention beneficially enables a hose to be attached to spigots having stripped threads, no threads at all, or odd-shaped (e.g. hexagonal) heads. Advantageously, the adaptor includes provisions for effecting an improved seal about a spout and means for preventing the adaptor from swelling in response to a water pressure build-up. Further, the improved adaptor can be readily utilized without requiring the use of tools.

In a preferred form of the invention, the conically enlarged first end of the adaptor is provided with a plurality of annular ribs spaced along its interior, and a plurality of annular ridges spaced along its exterior. The ridges and ribs are staggered such that consecutive external ridges will have a rib located therebetween on the adaptor interior. The interior annular ribs grip a faucet spout that the conical end is slipped over, thereby improving a friction fit of the adaptor around the spout. An improved seal is achieved when the adjustable clamp squeezes one or more ribs about the spout. The external annular ridges advantageously serve to position the clamp at locations whereat said clamp will be directly aligned with an appropriate internal rib so that clamping forces are focused upon the rib for a liquid-tight seal.

The adjustable clamp preferably is a worm gear type clamp having an adjustable band that encircles the conical end of the adaptor. The exterior annular ridges are preferably equidistantly spaced apart by approximately the width of the band so that the band is effectively retained between any two consecutive ridges. A thumbscrew tightener enables one to adjust the clamp without tools.

The body of the adaptor is comprised of a flexible material, preferably rubber, that has an internal reinforcement web of a fibrous material or metal mesh. The reinforcement web prevents swelling of the adaptor body in response to a water pressure build-up. The second end of the adaptor, opposite its conical end, is provided with a threaded male clinch for union with a garden hose, or the like.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a side elevation of an adaptor embodying the invention, showing a male threaded end for attaching a garden hose, or the like, to the adaptor, a conical enlarged end for engaging a faucet spout, pipe end, or the like, and also illustrating a plurality of exterior ridges on the adaptor's conical portion;

FIG. 2 is a front elevation taken generally on line 2—2 of FIG. 1, showing a plurality of annular, concentric ribs provided on the interior of the adaptor's conical portion;

FIG. 3 is a side elevation of a worm gear type clamp having an adjustable band and a thumbscrew tightener;

FIG. 4 is a cross sectional view taken generally on line 4—4 of FIG. 1, illustrating the annular ribs of FIG. 2 in offset relation e exterior ridges of FIG. 1;

DETAILED DESCRIPTION OF THE PREFERRED EMBODIMENT

Figure 5:
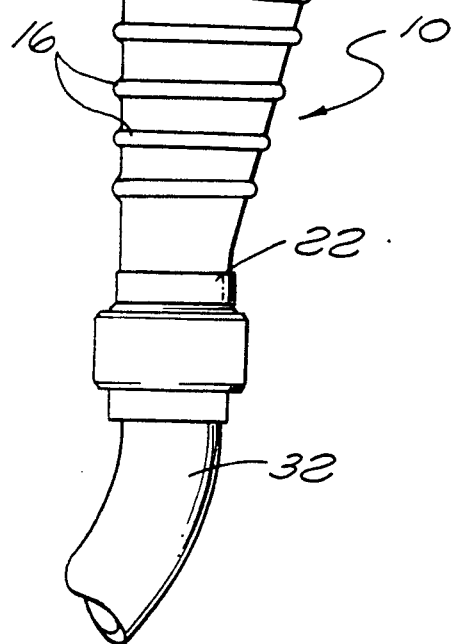
FIG. 5 is a reduced side elevation illustrating the manner in which the clamp retains the adaptor in engagement about a faucet spout, showing a pair of consecutive ridges positioning the clamp in overlapping relation with an interior rib, also showing, in phantom outline, several ribs abutting the spout and further illustrating in fragment, a garden hose, or the like, attached to the adaptor's threaded end.

As shown in the drawings for purposes of illustration, the present invention resides in an improved adaptor for connecting a hose to a faucet spout, pipe outlet, or the like. As illustrated in FIG. 1, the adaptor 10 is provided with a conically enlarged end 12 that is easily slipped over a spigot, or the like, for a friction fit, and a threaded end 14 which is joined with a conventional outdoor hose.

The present invention advantageously enables one to attach a garden hose, or the like, to spigots having stripped threads or no threads at all. The improved adaptor is particularly useful for attaching a hose to indoor faucet spouts, which generally lack threads, thereby allowing the indoor faucet to be utilized as a source of warm water outside, where, typically, heated water is unavailable. Previously, the predominance of outdoor spigots that supply only cold water, and unthreaded indoor faucets unsuitable for hook-up with a hose made it difficult to provide a supply of warm or hot water outdoors for e.g. washing autos or pets. The present invention enables one to achieve a leak-proof union of a hose with even faucets having odd shaped (e.g. hexagonal) heads or broken pipe ends.

Further advantages of the present invention include a reinforced body that is resistant to pressure-induced swelling, and a plurality of exterior annular ridges 16 which position and retain a worm gear clamp 18 (FIG. 3) for an improved seal about a spigot (as will be detailed hereinafter). Moreover, the improved adaptor can be quickly and easily installed without requiring the use of tools.

Previous adaptors for effecting a faucet connection include U.S. Pat. No. 1,117,840, which utilizes a plurality of internal annular lips to grip a faucet spout in a friction fit. Among the improvements achieved by the present invention, is the utilization of the exterior annular ridges 16 to align the worm gear clamp 18 with annular ribs 20 (FIGS. 2, 4 and 6) provided along the interior of the conical end 12 of the adaptor 10. This advantageously ensures that clamping action is focused upon an appropriate internal rib 20 for a more positive seal of the rib about a spout.

In accordance with the present invention, and with reference to FIG. 1, the adaptor 10 has a threaded male clinch 22 at end 14 so that a conventional outdoor hose can be easily screwed into engagement therewith. Alternative means for connecting the adaptor end 14 with a hose are deemed to be within the scope of the present invention. The adaptor 10 includes a short neck 24 (preferably one half inch in internal diameter) which connects threaded end 14 with the conically enlarged end 12.

As best viewed in FIG. 4, the conical end 12 has a plurality of annular ridges 16 spaced equidistantly along its exterior, and a plurality of equidistantly spaced annular ribs 20 along its interior. The ridges 16 and ribs 20 are concentric about a common axis. Preferably the spacing between adjacent ribs is one-half inch and the spacing between adjacent ridges is also one-half inch. However, alternatively, the ribs and ridges can be spaced by any distance which is selected in accordance with the width of an adjustable band 26 (FIG. 3) of the clamp 18. That is, consecutive external annular ridges 16 should be spaced apart by a distance roughly equivalent to the band width so that the band 26 is effectively retained in place between consecutive ridges.

Figure 6:
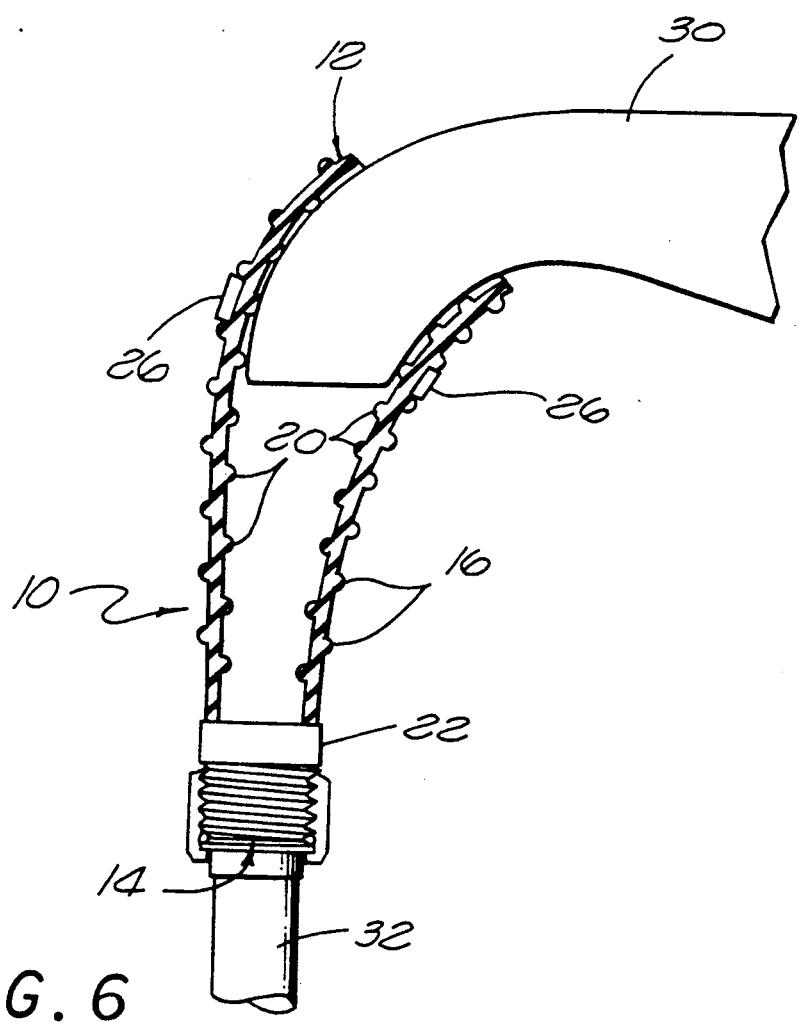
FIG. 6 is a reduced side elevation similar to FIG. 5, in which the adaptor is shown in cross section to illustrate engagement of the annular ribs with the faucet spout, and further showing the manner in which the adjustable band of the clamp is centered over an appropriate interior rib by a pair of consecutive exterior ridges.

The ridges 16 serve as means for positioning the band 26 in alignment (preferably centered) over an internal annular rib 20, as illustrated in FIGS. 5 and 6. The external ridges 16 are staggered relative to the internal ribs 20 (see FIG. 4) such that consecutive ridges 16 will have a rib 20 located therebetween on the adaptor interior. It is to be understood that the offset relation of the ridges 16 to the ribs 20 can be achieved using irregular spacing as well. This feature, whereby external ridges 16 locate the clamp band 26 directly over an appropriate internal rib 20, advantageously focuses clamping action about the rib 20 for a more positive liquid-tight seal of said rib about a spigot.

The adjustable band 26 fits snugly between adjacent ridges 16 and is tightened about the adaptor's conical end 12 by a thumbscrew tightener 28 provided on the worm gear clamp 18.

The adaptor 10 is preferably comprised of Neoprene rubber or a similar flexible material. The present invention is improved to resist swelling of the adaptor which can occur from water pressure build-up when an engaged faucet is open while the nozzle of an associated hose is closed. The rubber body of the present invention includes an internal reinforcement mesh or webbing of a fibrous material such as nylon or hemp, or a metal wire mesh. This internal reinforcement web (not visible in the drawings) effectively prevents swelling of the adaptor in response to water pressure build-up. A suggested length of the adaptor 10 is 7½ inches, with its conical end 12 having an inside diameter of approximately 2 inches at its widest point. The conical end 12 is effectively fit about pipes and spouts of various diameters, thereby making the present invention a "universal" adaptor suitable for use with most spigots.

In use the conical end 12 is slipped over the spout of a faucet 30 (FIGS. 5 and 6) and forced upward until the spout is gripped by one or more annular ribs 20. Then the thumbscrew tightener 28 is employed to tighten the adjustable band 26 of the clamp 18 about the adaptor 10. Prior to tightening, the band 26 should be fit between a pair of external ridges 16 which are located adjacent to those internal ribs 20 that are engaging the faucet 30. Once a liquid-tight seal has been effected, water will flow from the faucet 30, through the adaptor 10, and into a hose 32 in threaded engagement with the male clinch 22.

From the foregoing, it will be appreciated that the improved adaptor of the present invention advantageously fits a variety of spigot sizes and pipe outlets, without required tools for installation. Further, the present invention provides a means to attach a threaded hose to a spigot that is unthreaded, irregularly shaped or damaged with stripped threads. Moreover, the improved adaptor advantageously prevents pressure-induced swelling and positions and retains clamping means at locations whereat the action of the clamping means is directly focused upon an internal gripping rib, thereby effecting a more positive liquid-tight seal of the adaptor about a water outlet.

While a particular form of the invention has been illustrated and described, it will be apparent that various modifications can be made without departing from the spirit and scope of the invention. Accordingly, it is not intended that the invention be limited, except as by the appended claims.

I claim:

1. An improved adaptor for connecting a hose to a faucet spout, pipe, or the like, comprising:
   a tubular body of flexible material having a conically enlarged first end for engaging a faucet spout, or the like, said body including a plurality of internal annular ribs and a second end having means for connecting said adaptor to a hose; and
   means for clamping said first end about a faucet spout, or the like, wherein said tubular body includes means for positioning and retaining said clamping means on the exterior of said tubular body at a plurality of locations whereat said clamping means will be aligned with a single rib of said plurality of internal annular ribs such that said clamping means squeezes said single aligned annular rib about the faucet spout, thereby positively effecting a liquid-tight seal.

2. An improved adaptor as set forth in claim 1, wherein said means for connecting said adaptor to a hose includes a threaded male clinch.

3. An improved adaptor as set forth in claim 1, wherein said means for positioning and retaining said clamping means comprise a plurality of annular ridges around the exterior of said conically enlarged first end.

4. An improved adaptor as set forth in claim 3, wherein said annular ridge are offset with respect to said annular ribs such that consecutive annular ridges along the exterior of the tubular body have a single annular rib located therebetween on the interior of said tubular body.

5. An improved adaptor as set forth in claim 4, wherein said annular ridges are equidistantly spaced along the exterior of the tubular body.

6. An improved adaptor as set forth in claim 3, wherein said clamping means comprises a worm gear type clamp having an adjustable band that encircles the conically enlarged first end and thumbscrew means for tightening said band about said first end.

7. An improved adaptor as set forth in claim 6, wherein said annular ridges are equidistantly spaced along the exterior of the tubular body, and wherein consecutive ridges are spaced apart by a distance that is substantially equal to the width of said band, such that the band is snugly accommodated between consecutive ridges and thereby is retained in place between said ridges.

8. An improved adaptor for connecting a hose to a faucet spout, pipe, or the like, comprising:
   a tubular body of flexible material having a conically enlarged first end for engaging a faucet spout, or the like, said body including a plurality of internal annular ribs and a second end having threaded means for connecting said adaptor to a hose; and
   a clamp having an adjustable band that encircles the conically enlarged first end and means for tightening said band about said first end, wherein said tubular body includes a plurality of external annular ridges for positioning and retaining said clamp on the exterior of said tubular body at a plurality of locations, wherein at each of said locations said band will be aligned with a single internal annular rib so that tightening of said clamp will squeeze the aligned rib about the faucet spout, thereby positively effecting a liquid-tight seal.

9. An improved adaptor as set forth in claim 8, wherein said annular ridges are offset with respect to said annular ribs such that consecutive annular ridges along the exterior of the tubular body have a single annular rib located therebetween on the interior of said tubular body.

10. An improved adaptor as set forth in claim 9, wherein said annular ridges are equidistantly spaced along the exterior of the tubular body, and wherein consecutive ridges are spaced apart by a distance that is substantially equal to the width of said band such that the band is snugly accommodated between consecutive ridges and thereby is retained in place between said ridges.

11. An improved adaptor as set forth in claim 10, wherein said annular ribs are equidistantly spaced along the interior of the tubular body.

12. An improved adaptor for connecting a hose to a faucet spout, or the like, comprising:
   a tubular body of flexible material having a conically enlarged first end for engaging a faucet spout, or the like, said body including a plurality of internal annular ribs and a second end having threaded means for connecting said adaptor to a hose; and
   a worm gear type clamp having an adjustable band that encircles the conically enlarged first end and means for tightening said band about said first end, wherein said tubular body includes a plurality of external annular ridges which position and retain said clamp on the exterior of said tubular body at locations whereat said band of said clamp will be aligned with a single internal annular rib such that tightening said band about said first end squeezes said aligned rib about the faucet spout, thereby effecting a liquid-tight seal, and wherein said annular ribs and said annular ridges are equidistantly spaced on said tubular body, with said ridges being offset with respect to said ribs such that consecutive annular ridges along the exterior of the tubular body will have a single annular rib located therebetween on the interior of said tubular body.

13. An improved adaptor as set forth in claim 12, wherein consecutive ridges are spaced apart by a distance that is substantially equal to the width of said band such that the band is snugly accommodated between consecutive ridges.

14. An improved adaptor as set forth in claim 12, wherein said threaded means for connecting said adaptor to a hose comprise a male clinch.

15. An improved adaptor as set forth in claim 12, wherein each annular rib is located completely between a pair of consecutive offset ridges such that no portion of an annular rib extends beyond space lying between the pair of consecutive ridges on either side thereof.

16. An improved adaptor as set forth in claim 12, including three or more external annular ridges.

* * * * *